US012028682B2

(12) United States Patent
Cho

(10) Patent No.: US 12,028,682 B2
(45) Date of Patent: Jul. 2, 2024

(54) MOBILE HEARING AID HAVING FOLDABLE EARPHONE AND HOWLING PREVENTION CIRCUIT

(71) Applicant: Sung Jae Cho, Miryang-si (KR)

(72) Inventor: Sung Jae Cho, Miryang-si (KR)

( * ) Notice: Subject to any disclaimer, the term of this patent is extended or adjusted under 35 U.S.C. 154(b) by 100 days.

(21) Appl. No.: 17/949,667

(22) Filed: Sep. 21, 2022

(65) Prior Publication Data

US 2024/0048918 A1 Feb. 8, 2024

(30) Foreign Application Priority Data

Aug. 3, 2022 (KR) ........................ 10-2022-0096586

(51) Int. Cl.
*H04R 25/00* (2006.01)

(52) U.S. Cl.
CPC ......... *H04R 25/453* (2013.01); *H04R 25/505* (2013.01); *H04R 2225/43* (2013.01)

(58) Field of Classification Search
CPC ........................... H04R 25/453; H04R 25/505; H04R 2225/43; H04R 25/353; H04R 1/1008; H04R 25/554; H04R 25/603; H04R 1/08
See application file for complete search history.

(56) References Cited

U.S. PATENT DOCUMENTS

2011/0286620 A1 11/2011 Flynn

FOREIGN PATENT DOCUMENTS

JP 11-275694 A 10/1999
KR 20-0329947 Y1 10/2003
KR 10-2013-0054898 A 5/2013

OTHER PUBLICATIONS

Japanese Office Action dated Oct. 24, 2023 in Application No. 2022-149318.

*Primary Examiner* — Tuan D Nguyen
(74) *Attorney, Agent, or Firm* — Sughrue Mion, PLLC

(57) ABSTRACT

The present invention relates to a mobile hearing aid having foldable earphones and howling prevention circuits mounted on headwear, including: a support member disposed on the inner periphery of the headwear and made of plastic or metal; and sensors provided on the surfaces of the earphones facingly covering a wearer's ears to detect the infrared radiation emitted from the human body, wherein hearing aid sounds are provided to the wearer when the earphones are covered on his or her ears and muted when the earphones are open from his or her ears, thereby preventing the occurrence of howling from the earphones open from his or her ears.

9 Claims, 10 Drawing Sheets

( Conventional technology )

( Conventional technology )

MOBILE HEARING AID HAVING FOLDABLE EARPHONE AND HOWLING PREVENTION CIRCUIT

CROSS REFERENCE TO RELATED APPLICATION OF THE INVENTION

The present application claims the benefit of Korean Patent Application No. 10-2022-0096586 filed in the Korean Intellectual Property Office on Aug. 3, 2022, the entire contents of which are incorporated herein by reference.

BACKGROUND OF THE INVENTION

Field of the Invention

The present invention relates to a mobile hearing aid, and more specifically, to a mobile hearing aid having foldable earphones and howling prevention circuits that is capable of being mounted on headwear such as hats, caps, sun visors, and the like to enhance a wearer's conveniences through the foldable earphones and to protect the occurrence of howling through the howling prevention circuits.

Background of the Related Art

As one of conventional technologies, a hat type hearing aid with a microphone is disclosed in Korean Utility Model Registration No. 20-0302614 Y1, which is shown in FIG. 1. The conventional technology as filed by the same applicant and inventor as the invention is configured to have earphones attached to the outside of a typical hat, a microphone mounted inside or outside the hat, and a battery located inside the hat, thereby enhancing wearing comfort, conveniences of use, and reduction in cost.

As another conventional technology, a hearing aid connected to a portable electronic device is disclosed in Korean Patent Registration No. 10-1648840 B1, which is shown in FIG. 2. The hearing aid is divided into a main hearing aid part and an auxiliary hearing aid part, and the main hearing aid part is attached to a case of the portable electronic device and connected to the portable electronic device through a wired cable for data transmission, while the auxiliary hearing aid part is located on a wearer's ear, thereby improving conveniences of use.

As yet another conventional technology, a smart hearing aid is disclosed in Korean Patent Registration No. 10-1585793 B1, which is shown in FIG. 3. The smart hearing aid includes: a communication part connected to an external smart device to receive acoustic signals of the smart device through a communication network; a microphone part for receiving surrounding acoustic waves to output surrounding acoustic signals; a speaker part inserted into or located close to a wearer's ears to output the acoustic signals of the smart device and the surrounding acoustic signals to the wearer; a memory in which specific acoustic signals through which the wearer recognizes surrounding situations are stored; and a control module operating in an entertainment mode where the acoustic signals of the smart device are outputted through the speaker part and in a hearing aid mode where the surrounding acoustic signals are outputted through the speaker part, so that while operating in the entertainment mode, the control module analyzes the variations in the waveforms of the surrounding acoustic signals inputted through the microphone part in real time and, if it is determined that the waveforms of the surrounding acoustic signals correspond to the waveforms of the specific acoustic waveforms, and converts the entertainment mode into the hearing aid mode automatically, turns down the volume of the acoustic signals of the smart device, or turns up the volume of the surrounding acoustic signals.

SUMMARY OF THE INVENTION

Accordingly, the present invention has been made in view of the above-mentioned problems occurring in the related art, and it is an object of the present invention to provide a mobile hearing aid having foldable earphones and howling prevention circuits that is capable of being mounted on headwear such as hats, caps, sun visors, and the like to enhance a wearer's conveniences through the foldable earphones and, as sensors are provided on the surfaces of the earphones facingly covering the wearer's ears to detect the infrared radiation emitted from the human body, allowing hearing aid sounds to be provided to him or her when the earphones are covered on his or her ears and to be muted when the earphones are open from his or her ears through the howling prevention circuits.

To accomplish the above-mentioned objects, according to the present invention, there is provided a mobile hearing aid having foldable earphones and howling prevention circuits mounted on headwear, including: a support member disposed on the inner periphery of the headwear and made of plastic or metal; and sensors provided on the surfaces of the earphones facingly covering a wearer's ears to detect the infrared radiation emitted from the human body, wherein hearing aid sounds are provided to the wearer when the earphones are covered on his or her ears and muted when the earphones are open from his or her ears, thereby preventing the occurrence of howling from the earphones open from his or her ears.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE PREFERRED EMBODIMENTS

Before the present invention is disclosed and described, it is to be understood that the disclosed embodiments are merely exemplary of the invention, which can be embodied in various forms. Therefore, the embodiments may be embodied in different forms and should not be construed as limited to the embodiments set forth herein but may be modified and variously implemented by those skilled in the art.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Thus, although the invention is described with respect to specific embodiments, it will be appreciated that the invention is intended to cover all modifications and equivalents within the scope of the invention.

Objects, characteristics and advantages of the present invention will be more clearly understood from the detailed description as will be described below and the attached drawings. If it is determined that the detailed explanation on the well known technology related to the present invention makes the scope of the present invention not clear, the explanation will be avoided for the brevity of the description. Hereinafter, an embodiment of the present invention will be described in detail below with reference to the accompanying drawings.

Figure 1:
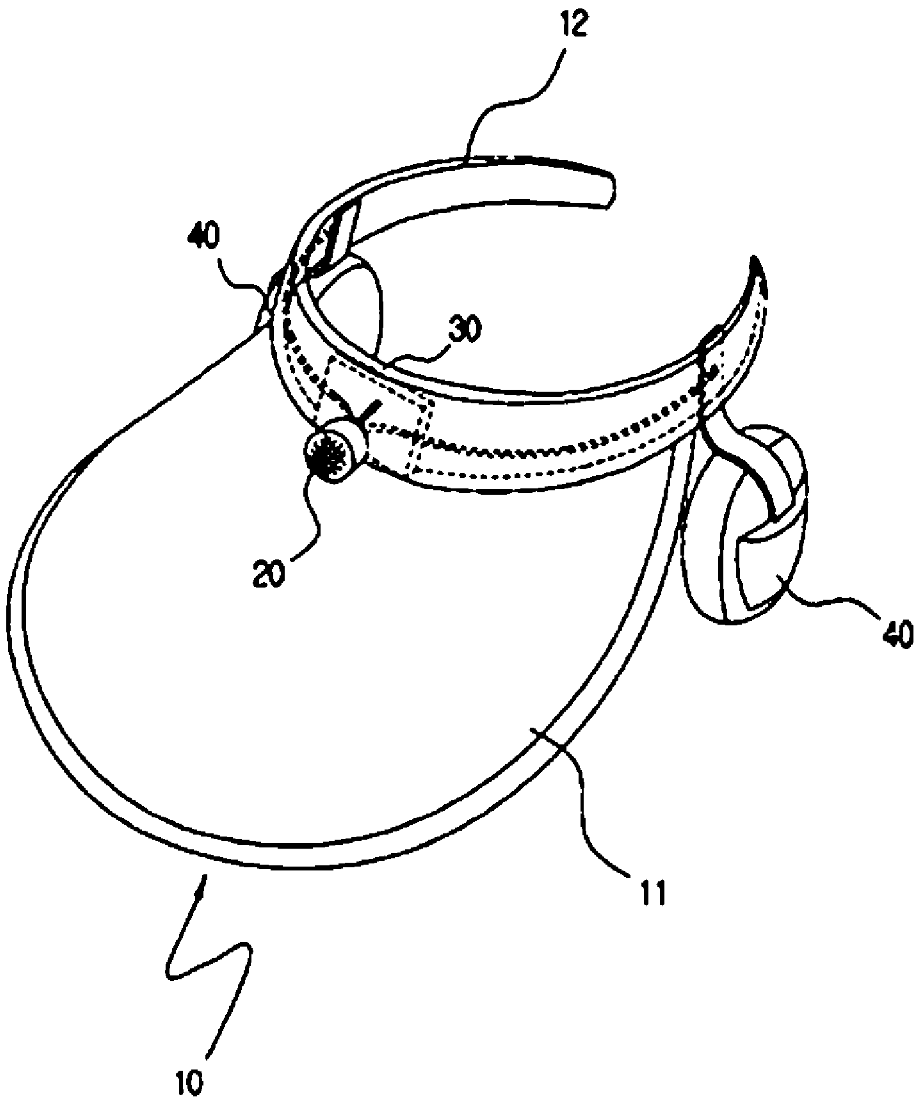
FIG. 1 is a perspective view showing a conventional hat type hearing aid with a microphone.
Figure 2:
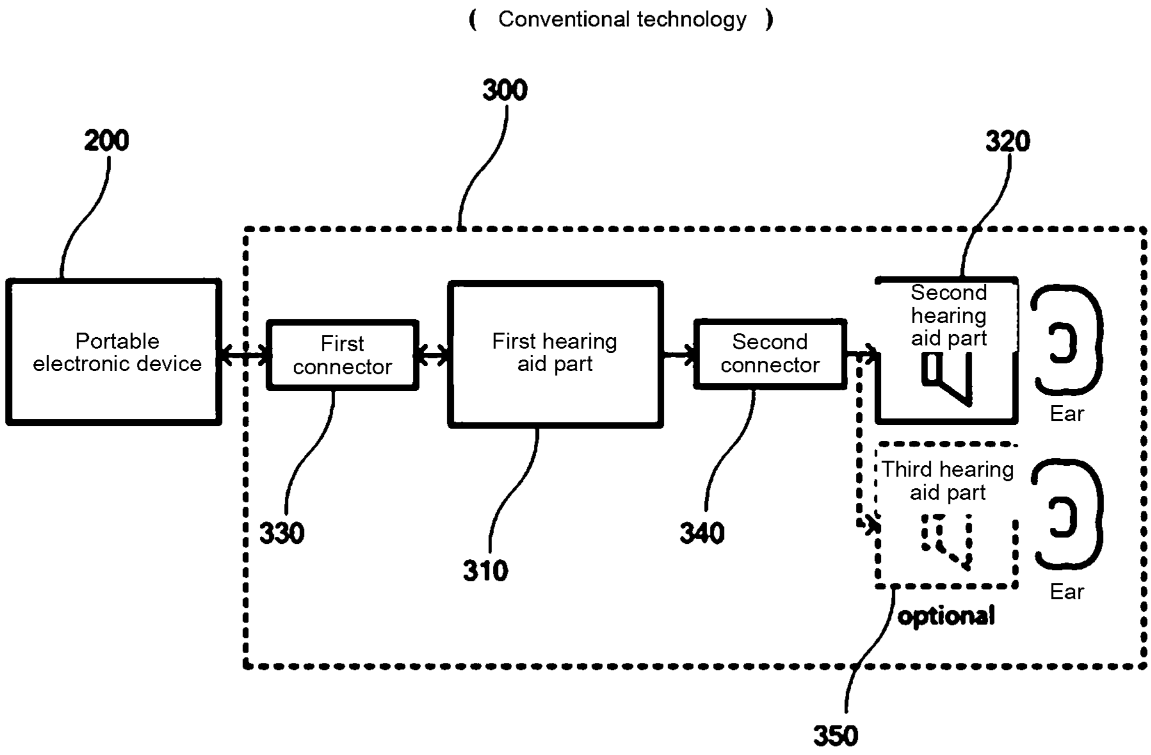
FIG. 2 is a block diagram showing another conventional hearing aid connected to a portable electronic device.
Figure 3:
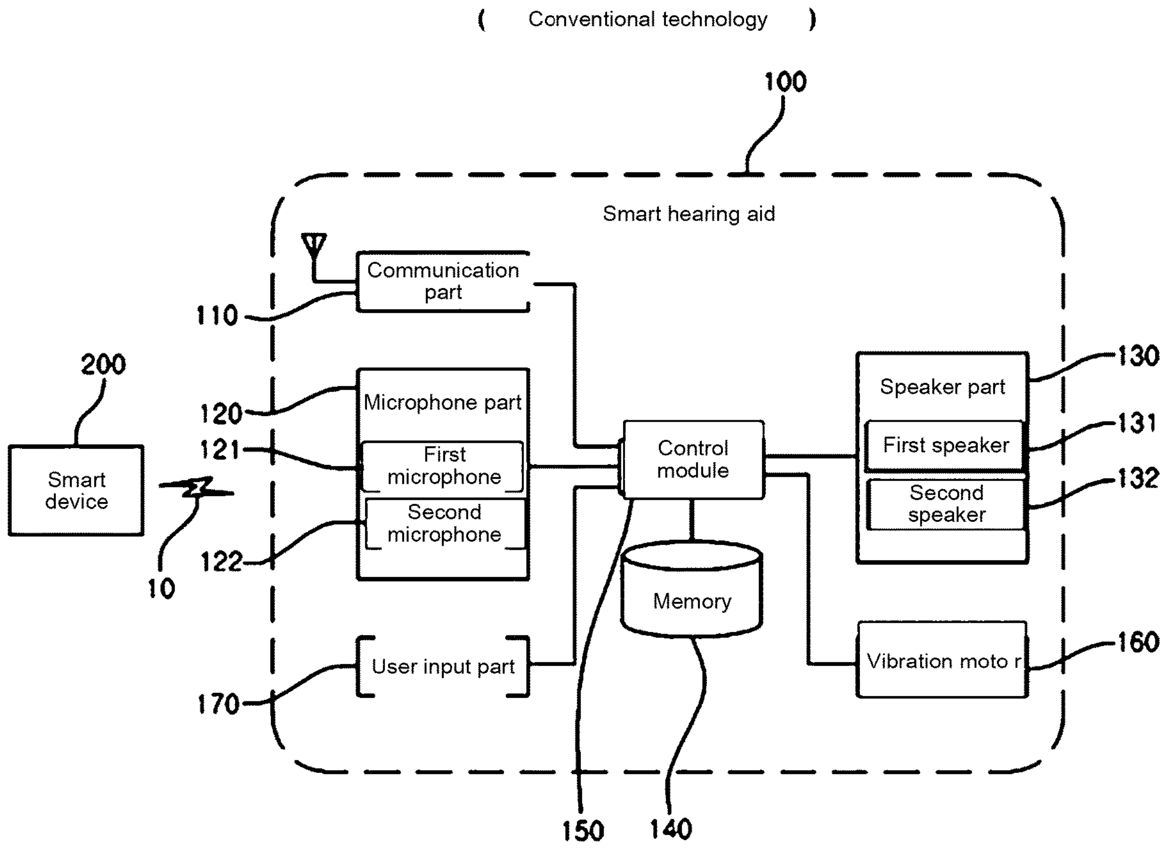
FIG. 3 is a block diagram showing yet another conventional smart hearing aid.
Figure 4:
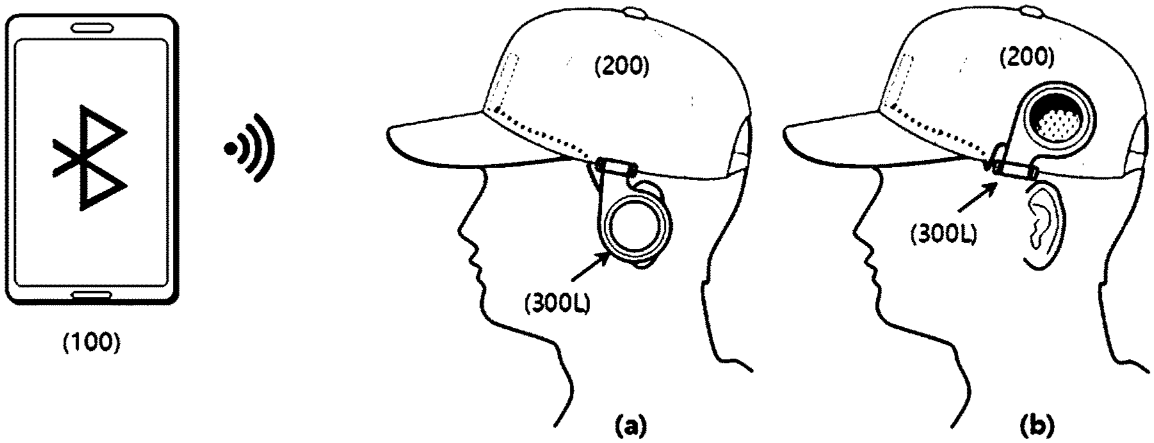
FIG. 4 is exemplary views showing a mobile hearing aid with foldable earphones according to the present invention.

(a) and (b) of FIG. 4 are exemplary views showing a mobile hearing aid with foldable earphones according to the present invention. A mobile hearing aid with foldable earphones according to the present invention is configured to amplify the sound waves inputted to a microphone of a mobile communication terminal 100 according to bands, transmit the amplified sound waves as data to a near field communication channel such as Bluetooth, and receive the data to provide the received data as analog signals to earphones. In this case, the earphones (wherein only the left earphone 300L is just shown) are foldable by means of hinge coupling to thus cover or open a wearer's ears. Accordingly, the mobile hearing aid with the foldable earphones according to the present invention is mounted on a cap 200, a sun visor, or a hair band. Hereinafter, an exemplary embodiment in which the mobile hearing aid according to the present invention is mounted on the cap 200 will be explained.

Figure 5:
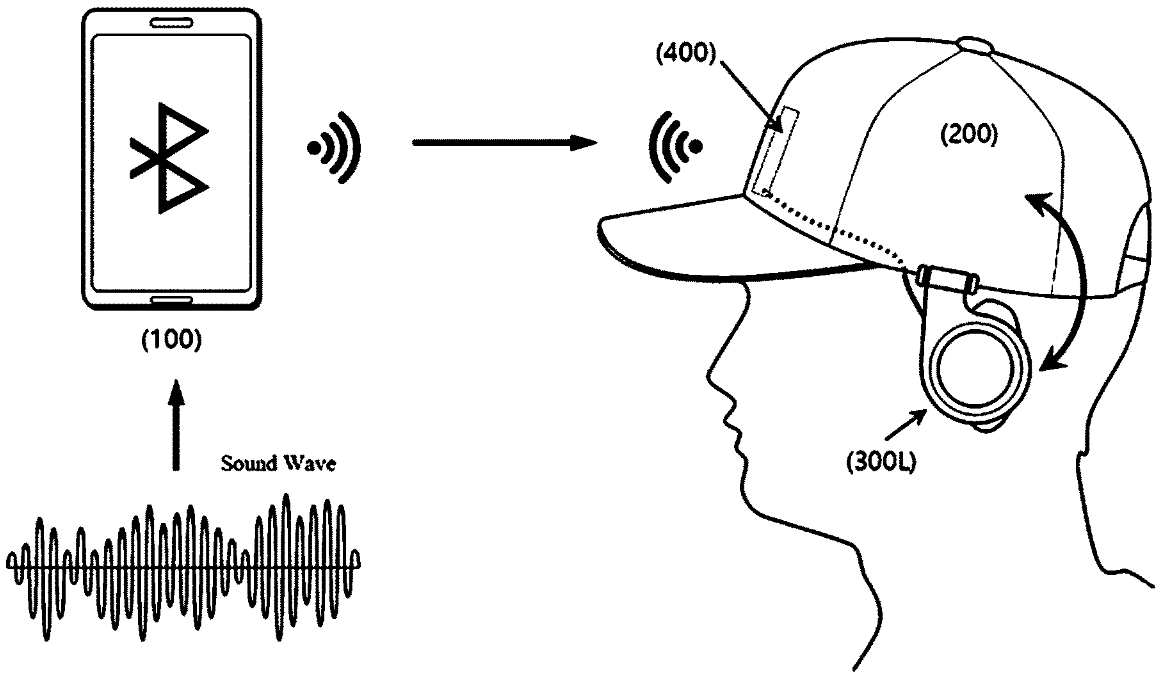
FIG. 5 is an exemplary view showing an operating state of the mobile hearing aid with the foldable earphones according to the present invention.

FIG. 5 is an exemplary view showing an operating state of the mobile hearing aid with the foldable earphones according to the present invention. The mobile hearing aid according to the present invention serves to compensatedly amplify the sound waves inputted to the microphone of the mobile communication terminal 100 according to the wearer's hearing loss bands and transmit the amplified sound waves as audio stream data to the near field communication channel such as Bluetooth. A hearing aid processor 400 receives the audio stream data from the mobile communication terminal 100, converts the data into the analog signals, and provides the converted signals to the wearer's ears through the earphones 300R and 300L. The mobile hearing aid according to the present invention is configured to allow the earphones 300R and 300L (wherein only the left earphone 300L is just shown) and the hearing aid processor 400 to be mounted on the cap 200, the sun visor, or the hair band, separately from the mobile communication terminal 100. Accordingly, it is convenient for the wearer to wear and use the mobile hearing aid, and he or she has the functions of the mobile hearing aid, without any contacts of receivers with ear canals such as middle ears and inner ears.

Figure 6:
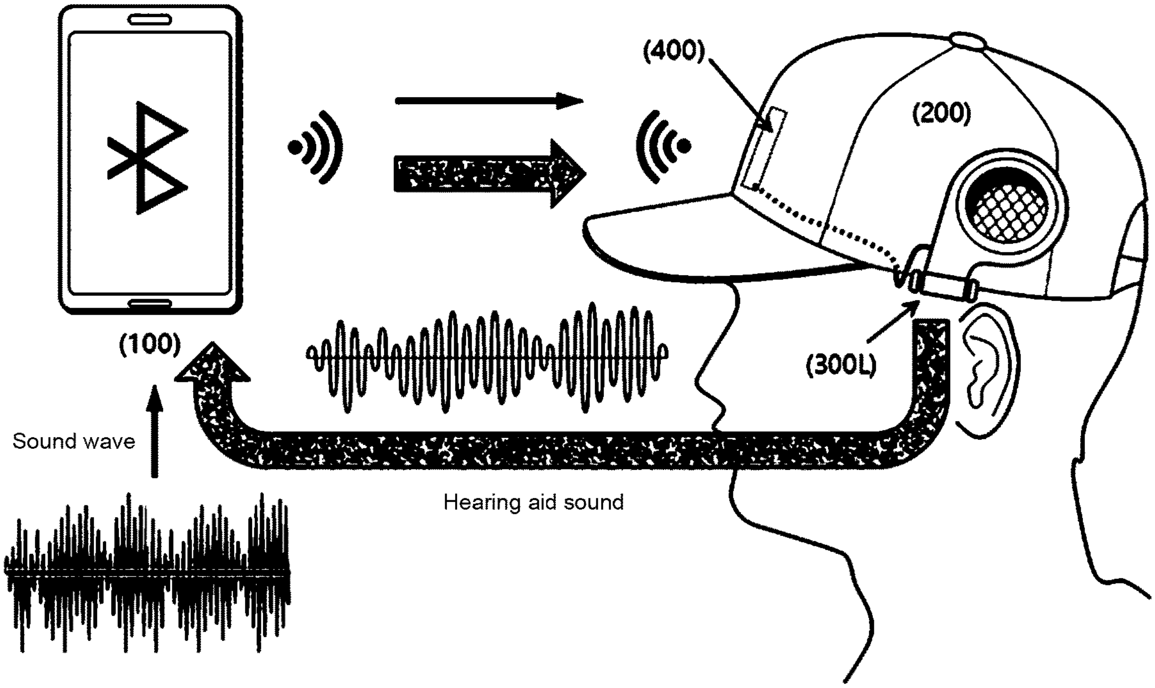
FIG. 6 is an exemplary view showing a howling mechanism of the mobile hearing aid with the foldable earphones according to the present invention.

FIG. 6 is an exemplary view showing a howling mechanism of the mobile hearing aid with the foldable earphones according to the present invention. The mobile hearing aid according to the present invention compensatedly amplifies the sound waves inputted to the microphone according to the wearer's hearing loss bands, transmits the amplified sound waves as audio stream data, allows the hearing aid processor 400 to receive the audio stream data, allows the hearing aid processor 400 to convert the data into the analog signals, and provides the converted signals to the wearer' ears through the earphones 300R and 300L (wherein only the left earphone 300L is just shown). In this case, if the earphones 300R and 300L are open, the hearing aid sounds provided to the wearer's ears from the hearing aid processor 400 are inputted to the microphone, together with external sound waves, and thus repeatedly played, thereby causing howling. To prevent the occurrence of the howling, the power of the mobile communication terminal 100 or the hearing aid processor 400 may be turned off, but it is very inconvenient to turn on and off the power of the mobile communication terminal 100 or the hearing aid processor 400 whenever the earphones (wherein only the left earphone 300L is just shown) are covered or open on or from the wearer's ears. If one earphone is covered on the wearer's ear and the other is open from the wearer's other ear so as to perform a phone call, further, it is harder to turn on and off the power of the mobile communication terminal 100 or the hearing aid processor 400. Accordingly, the mobile hearing aid according to the present invention provides the howling prevention circuits as well as the foldable earphones.

Figure 7:
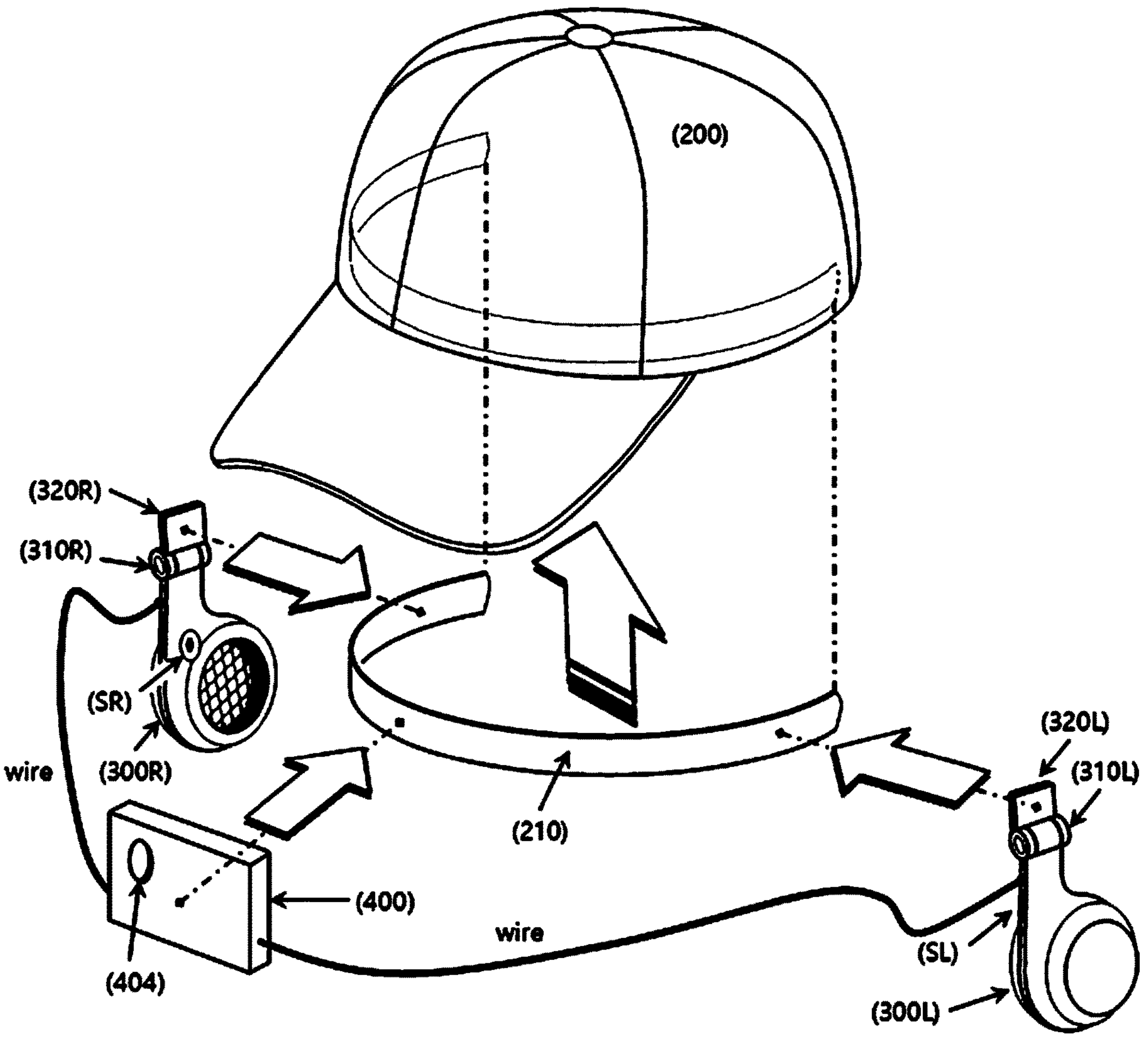
FIG. 7 is an exploded perspective view showing the mobile hearing aid with the foldable earphones and howling prevention circuits according to the present invention.

FIG. 7 is an exploded perspective view showing the mobile hearing aid with the foldable earphones and howling prevention circuits according to the present invention. The mobile hearing aid with the foldable earphones and the howling prevention circuits according to the present invention may be mounted on the cap 200, the sun visor, and the like, and in an exemplary embodiment, the mobile hearing aid is mounted on the cap 200.

The cap 200 has a support member 210 disposed on the inner periphery thereof and made of plastic or metal.

The left earphone 300L is located on one side of the support member 210. A left hinge 310L is fixed to the left earphone 300L to rotate the left earphone 300L up and down, and a left hinge fixing member 320L is provided to fix the left hinge 310L to the support member 210.

The left earphone 300L has a left channel human body infrared sensor SL located on the surface facing the ear to detect the infrared radiation emitted from the human body.

The right earphone 300R is located on the other side of the support member 210. A right hinge 310R is fixed to the right earphone 300R to rotate the right earphone 300R up and down, and a right hinge fixing member 320R is provided to fix the right hinge 310R to the support member 210.

The right earphone 300R has a right channel human body infrared sensor SR located on the surface facing the ear to detect the infrared radiation emitted from the human body.

The hearing aid processor 400 is located on the center of the front of the support member 210 and fixed to the inside or outside of the cap 200, and the hearing aid processor 400 has a power switch 404.

The left earphone 300L and the right earphone 300R are connected to the hearing aid processor 400 by means of wires.

Figure 8:
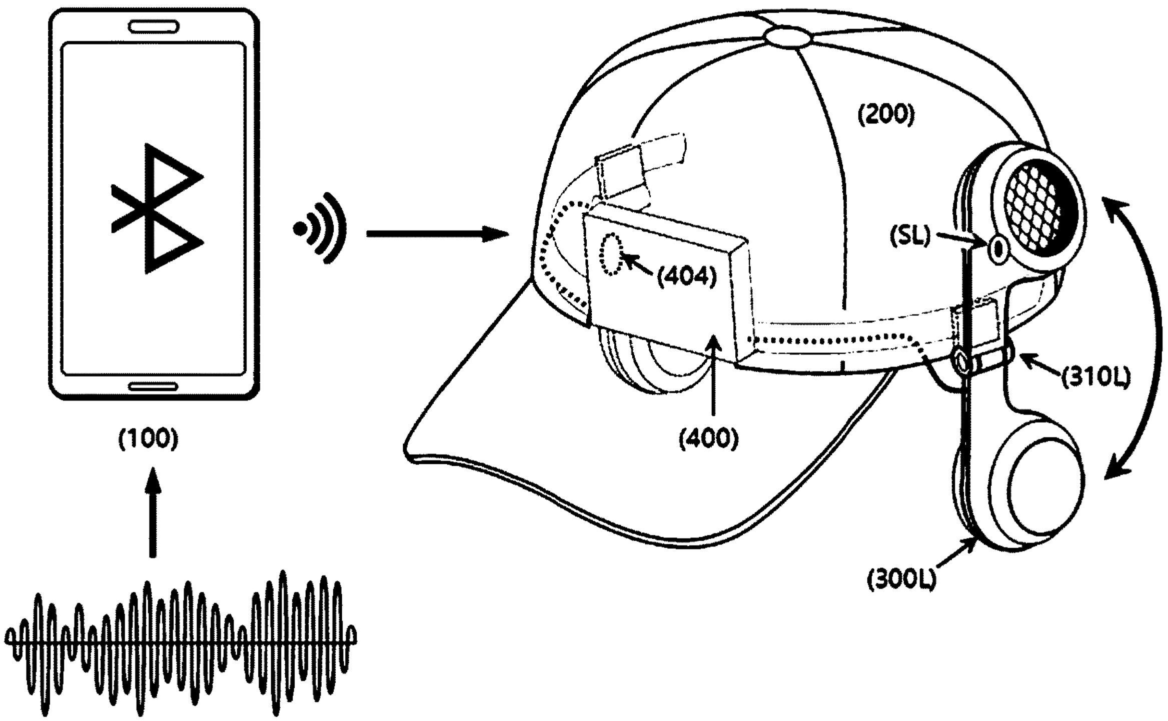
FIG. 8 is a perspective view showing the mobile hearing aid with the foldable earphones and the howling prevention circuits according to the present invention.

FIG. 8 is a perspective view showing the mobile hearing aid with the foldable earphones and the howling prevention circuits according to the present invention.

The left earphone 300L is located on one side of the support member 210, the left hinge 310L is fixed to the left earphone 300L to rotate the left earphone 300L up and down, and the left hinge fixing member 320L is provided to fix the left hinge 310L to the support member 210. Further, the left earphone 300L has the left channel human body infrared sensor SL located on the surface facing the ear to detect the infrared radiation emitted from the human body.

The right earphone 300R is located on the other side of the support member 210, the right hinge 310R is fixed to the right earphone 300R to rotate the right earphone 300R up and down, and the right hinge fixing member 320R is provided to fix the right hinge 310R to the support member 210. Further, the right earphone 300R has the right channel human body infrared sensor SR located on the surface facing the ear to detect the infrared radiation emitted from the human body.

The hearing aid processor 400 is located on the center of the front of the support member 210 and fixed to the inside or outside of the cap 200, and the hearing aid processor 400 has the power switch 404. The left earphone 300L and the right earphone 300R are connected to the hearing aid processor 400 by means of the wires.

Figure 9:
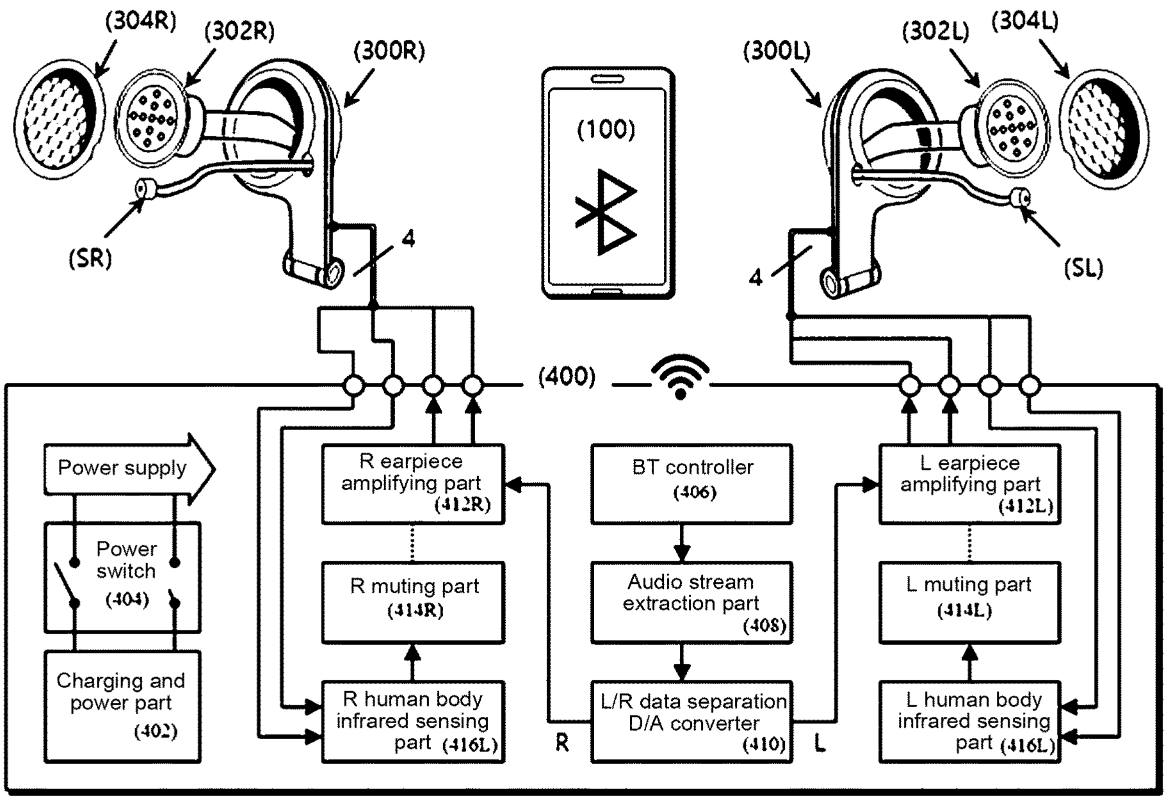
FIG. 9 is a block diagram showing a configuration of a hearing aid processor according to the present invention.

FIG. 9 is a block diagram showing a configuration of the hearing aid processor 400 of the mobile hearing aid with the foldable earphones and the howling prevention circuits according to the present invention.

The hearing aid processor 400 according to the present invention is configured to connect the right earphone 300R having a right channel earphone unit 302R for providing hearing aid sounds, a right channel earphone cover 304R, and the right channel human body infrared sensor SR and the left channel earphone 300L having a left channel earphone unit 302L for providing hearing aid sounds, a left channel earphone cover 304L, and the left channel human body infrared sensor SL by means of the wires.

The hearing aid processor 400 includes: a charging and power supply part 402; the power switch 404 for supplying the power supplied from the power supply part 402 thereto or cutting off the supply of the power therefrom; a BT controller 406 paired with the mobile communication terminal 100 to amplify the sound waves inputted to the microphone of the mobile communication terminal 100 according to the bands and transmit the amplified sound waves as the audio stream data to the near field communication channel such as Bluetooth; an audio stream extraction part 408 for extracting the audio stream data received from the BT controller 406; and an L/R data separation D/A converter 410 for separating left channel data and right channel data from the audio stream data received from the audio stream extraction part 408 to convert the separated data into left channel audio signals and right channel audio signals.

The right channel audio signals outputted from the L/R data separation D/A converter 410 are connected to a right (R) human body infrared sensing part 416R for detecting the infrared radiation emitted from the human body as the output of the right channel human body infrared sensor SR, an R muting part 414R operating if the infrared radiation emitted from the human body is detected through the R human body infrared sensing part 416R, and an R earpiece amplifying part 412R muting if there is a detection output for the infrared radiation emitted from the human body from the R muting part 414R, and the output of the R earpiece amplifying part 412R is connected to the right channel earphone unit 302R to provide or mute the hearing aid sounds.

The left channel audio signals outputted from the L/R data separation D/A converter 410 are connected to a left (L) human body infrared sensing part 416L for detecting the infrared radiation emitted from the human body as the output of the left channel human body infrared sensor SL, an L muting part 414L operating if the infrared radiation emitted from the human body is detected through the L human body infrared sensing part 416L, and an L earpiece amplifying part 412L muting if there is a detection output for the infrared radiation emitted from the human body from the L muting part 414L, and the output of the L earpiece amplifying part 412L is connected to the left channel earphone unit 302L to provide or mute the hearing aid sounds.

Accordingly, the sensors are provided on the surfaces of the earphones facingly covering the wearer's ears to detect the infrared radiation emitted from the human body. In this case, when the earphones are covered on his or her ears, the hearing aid sounds are provided to him or her, and contrarily, when the earphones are open from his or her ears, the hearing aid sounds are muted to prevent the occurrence of howling from the earphones open from his or her ears.

Figure 10:
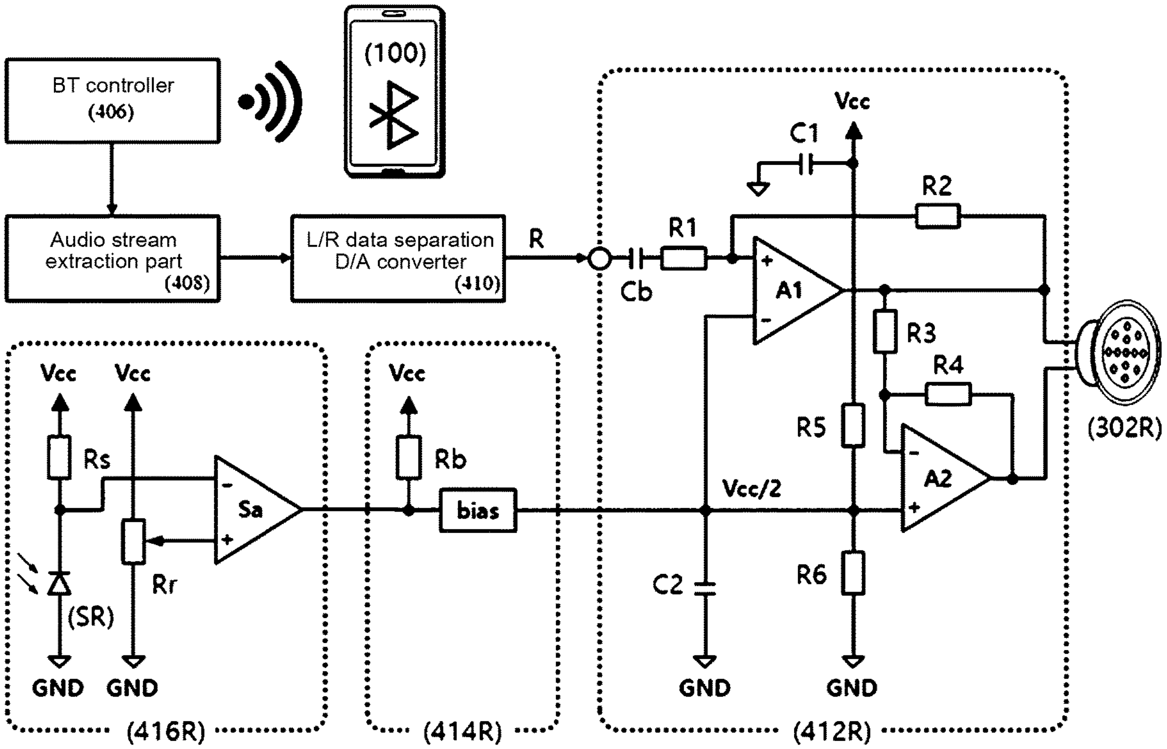
FIG. 10 is a circuit diagram showing the hearing aid processor according to the present invention.

FIG. 10 is a circuit diagram showing the hearing aid processor 400 of the mobile hearing aid with the foldable earphones and the howling prevention circuits according to the present invention.

As shown, the hearing aid processor 400 according to the present invention includes: the BT controller 406 paired with the mobile communication terminal 100 to amplify the sound waves inputted to the microphone of the mobile communication terminal 100 according to the bands and transmit the amplified sound waves as the audio stream data to the near field communication channel such as Bluetooth; the audio stream extraction part 408 for extracting the audio stream data received from the BT controller 406; and the L/R data separation D/A converter 410 for separating the left channel data and the right channel data from the audio stream data supplied from the audio stream extraction part 408 to convert the separated data into the left channel audio signals and the right channel audio signals.

The hearing aid processor 400 of the mobile hearing aid with the foldable earphones and the howling prevention circuits according to the present invention has the same configuration on the right channel circuit and the left channel circuit as each other, and therefore, only the right channel circuit will be explained below for the brevity of the description.

According to the circuit of the hearing aid processor 400, the R earpiece amplifying part 412R, which receives the right channel audio signals outputted from the L/R data separation D/A converter 410, serves as a non-inverting amplifier A1 having amplification of R2/R1 and an inverting amplifier A2 receiving the output of the non-inverting amplifier A1 and having amplification of –R4/R3 to differentially drive the right channel earphone unit 302R. In this case, the inverted input of the non-inverting amplifier A1 and the non-inverted input of the inverting amplifier A2 are sent to the central potential between Vcc and GND to minimize the influence of offset or drift through Rb and bias circuit of the R muting part 414R. In this case, the Rb and bias circuit of the R muting part 414R provide the bias of the non-inverting amplifier A1 and the inverting amplifier A2 and allows the bias to be zero potential, that is, GND to thus control the central potential of the inverted input of the non-inverting amplifier A1 and the non-inverted input of the inverting amplifier A2. If an output of a comparator Sa is zero (GND), the bias circuit of the R muting part 414R allows the central potential of the inverted input of the non-inverting amplifier A1 and the non-inverted input of the inverting amplifier A2 to become zero potential, and accordingly, the outputs of the non-inverting amplifier A1 and the inverting amplifier A2 become GND, so that the right channel signals provided from the L/R data separation D/A converter 410 are muted. The non-inverted input of the comparator Sa is sent to the Rr between Vcc and GND as a partial pressure, and if the infrared radiation emitted from the human body is detected by the serial connection between the inverted input thereof and the right channel human body infrared sensor SR, the output of the comparator Sa becomes GND, so that the signals sent to the right channel earphone unit 302R are muted.

Accordingly, the sensors are provided on the surfaces of the earphones facingly covering the wearer's ears to detect the infrared radiation emitted from the human body. In this case, when the earphones are covered on his or her ears, the hearing aid sounds are provided to him or her, and contrarily, when the earphones are open from his or her ears, the hearing aid sounds are muted to prevent the occurrence of howling from the earphones open from his or her ears.

As described above, the mobile hearing aid having the foldable earphones and the howling prevention circuits is configured to be mounted on the headwear such as hats, caps, sun visors, and the like to enhance the wearer's conveniences through the foldable earphones and as the sensors are provided on the surfaces of the earphones facingly covering his or her ears to detect the infrared radiation emitted from the human body, allow the hearing aid sounds to be provided to him or her when the earphones are covered on his or her ears and to be muted when the earphones are open from his or her ears through the howling prevention circuits.

The present invention may be modified in various ways and may have several exemplary embodiments. Accordingly, it should be understood that the invention covers all the modifications, equivalents, and replacements within the idea and technical scope of the invention. Therefore, the present invention is not to be restricted by the embodiments as mentioned above.

What is claimed is:

1. A mobile hearing aid having foldable earphones and howling prevention circuits mounted on headwear (200) to compensatedly amplify the sound waves inputted to a microphone of a mobile communication terminal (100) according to a wearer's hearing loss bands and transmit the amplified sound waves to a near field communication channel, the mobile hearing aid comprising:

- a support member (210) disposed on the inner periphery of the headwear (200) and made of plastic or metal;
- a left earphone (300L) located on one side of the support member (210);
- a left hinge (310L) fixed to the left earphone (300L) to rotate the left earphone (300L) up and down;
- a left hinge fixing member (320L) provided to fix the left hinge (310L) to the support member (210); and
- a left channel human body infrared sensor (SL) located on the surface of the left earphone (300L) facing the wearer's ear to detect the infrared radiation emitted from the human body.

2. The mobile hearing aid according to claim 1, further comprising:

- a right earphone (300R) located on the other side of the support member (210);
- a right hinge (310R) fixed to the right earphone (300R) to rotate the right earphone (300R) up and down;
- a right hinge fixing member (320R) provided to fix the right hinge (310R) to the support member (210); and
- a right channel human body infrared sensor SR located on the surface of the right earphone (300R) facing the wearer's ear to detect the infrared radiation emitted from the human body.

3. The mobile hearing aid according to claim 1, further comprising a hearing aid processor (400) located on the center of the front of the support member (210) and fixed to the inside or outside of the headwear (200), the hearing aid processor (400) having a power switch (404), and the left earphone (300L) and the right earphone (300R) being connected to the hearing aid processor (400) by means of wires.

4. The mobile hearing aid according to claim 3, wherein the hearing aid processor (400) is configured to connect the right channel earphone (300R) having a right channel earphone unit (302R) for providing hearing aid sounds, a right channel earphone cover (304R), and the right channel human body infrared sensor (SR) and the left channel earphone (300L) having a left channel earphone unit (302L) for providing hearing aid sounds, a left channel earphone cover (304L), and the left channel human body infrared sensor (SL), by means of the wires.

5. The mobile hearing aid according to claim 4, wherein the hearing aid processor (400) comprises:

- a charging and power supply part (402);
- the power switch (404) for supplying the power supplied from the power supply part (402) thereto or cutting off the supply of the power therefrom;
- a BT controller (406) paired with the mobile communication terminal (100) to amplify the sound waves inputted to the microphone of the mobile communication terminal (100) according to the bands and transmit the amplified sound waves as the audio stream data to the near field communication channel such as Bluetooth;
- an audio stream extraction part (408) for extracting the audio stream data received from the BT controller (406); and
- a left and right data separation D/A converter (410) for separating left channel data and right channel data from the audio stream data received from the audio stream extraction part (408) to convert the separated data into left channel audio signals and right channel audio signals.

6. The mobile hearing aid according to claim 5, wherein the right channel audio signals outputted from the left and right data separation D/A converter (410) are connected to a right human body infrared sensing part (416R) for detecting the infrared radiation emitted from the human body as the output of the right channel human body infrared sensor (SR), a right muting part (414R) operating if the infrared radiation emitted from the human body is detected through the right human body infrared sensing part (416R), and a right earpiece amplifying part (412R) muting if there is a detection output for the infrared radiation emitted from the human body from the right muting part (414R), and the output of the right earpiece amplifying part (412R) is connected to the right channel earphone unit (302R) to provide or mute the hearing aid sounds.

7. The mobile hearing aid according to claim 5, wherein the left channel audio signals outputted from the left and right data separation D/A converter (410) are connected to a left human body infrared sensing part (416L) for detecting the infrared radiation emitted from the human body as the output of the left channel human body infrared sensor (SL), a left muting part (414L) operating if the infrared radiation emitted from the human body is detected through the left human body infrared sensing part (416L), and a left earpiece amplifying part (412L) muting if there is a detection output for the infrared radiation emitted from the human body from the left muting part (414L), and the output of the left earpiece amplifying part (412L) is connected to the left channel earphone unit (302L) to provide or mute the hearing aid sounds.

8. The mobile hearing aid according to claim 6, wherein the right earpiece amplifying part (412R), which receives the right channel audio signals outputted from the left and right data separation D/A converter (410), serves as a non-inverting amplifier (A1) having amplification of R2/R1 and an inverting amplifier (A2) receiving the output of the non-inverting amplifier (A1) and having amplification of −R4/R3 to differentially drive the right channel earphone unit (302R), the inverted input of the non-inverting amplifier (A1) and the non-inverted input of the inverting amplifier (A2) are sent to the central potential between Vcc and GND to minimize the influence of offset or drift through Rb and bias circuit of the right muting part (414R), and if an output of a comparator (Sa) is zero (GND), the bias circuit of the right muting part (414R) allows the central potential of the inverted input of the non-inverting amplifier (A1) and the non-inverted input of the inverting amplifier (A2) to become zero potential so that the outputs of the non-inverting amplifier (A1) and the inverting amplifier (A2) become GND to allow the right channel signals provided from the left and right data separation D/A converter (410) to be muted.

9. The mobile hearing aid according to claim 8, wherein the non-inverted input of the comparator (Sa) is sent to the Rr between Vcc and GND as a partial pressure, and if the infrared radiation emitted from the human body is detected by the serial connection between the inverted input thereof and the right channel human body infrared sensor (SR), the output of the comparator (Sa) becomes GND, so that the signals sent to the right channel earphone unit (302R) are muted.

* * * * *